US012396058B2

United States Patent
Huang

(10) Patent No.: US 12,396,058 B2
(45) Date of Patent: Aug. 19, 2025

(54) WI-FI CONTROL METHOD AND APPARATUS AND ELECTRONIC DEVICE

(71) Applicant: VIVO MOBILE COMMUNICATION CO., LTD., Guangdong (CN)

(72) Inventor: Jiangmin Huang, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 408 days.

(21) Appl. No.: 18/071,766

(22) Filed: Nov. 30, 2022

(65) Prior Publication Data

US 2023/0088033 A1 Mar. 23, 2023

Related U.S. Application Data

(63) Continuation of application No. PCT/CN2021/097640, filed on Jun. 1, 2021.

(30) Foreign Application Priority Data

Jun. 3, 2020 (CN) .......................... 202010493976.2

(51) Int. Cl.
*H04W 76/30* (2018.01)
*H04L 65/1073* (2022.01)
*H04W 4/50* (2018.01)
*H04W 60/06* (2009.01)
*H04W 84/12* (2009.01)

(52) U.S. Cl.
CPC ............. *H04W 76/30* (2018.02); *H04W 4/50* (2018.02); *H04W 60/06* (2013.01); *H04W 84/12* (2013.01)

(58) Field of Classification Search
CPC ....... H04W 4/50–80; H04W 8/00–205; H04W 88/00–06
See application file for complete search history.

(56) References Cited

U.S. PATENT DOCUMENTS

2017/0318511 A1* 11/2017 Niranjan .............. H04B 17/327
2018/0152871 A1* 5/2018 Vanapalli .......... H04W 36/1446
(Continued)

FOREIGN PATENT DOCUMENTS

| CN | 105049442 A | 11/2015 |
|---|---|---|
| CN | 105657735 A | 6/2016 |

(Continued)

OTHER PUBLICATIONS

International Patent Application No. PCT/CN2021/097640, International Search Report and Written Opinion with Partial English Machine Translation mailed Aug. 27, 2021, 11 pages.

(Continued)

*Primary Examiner* — San Htun
(74) *Attorney, Agent, or Firm* — Fredrikson & Byron, P.A.

(57) ABSTRACT

This application discloses a Wi-Fi control method and apparatus and an electronic device. The method includes: receiving a Wi-Fi disconnect request message; sending, in response to the Wi-Fi disconnect request message, a notification message to a target network device, where the notification message indicates that a VoWiFi de-registration operation has been completed and that an internet key exchange IKE connection has been disconnected; and performing, in a case that a response message for responding to the notification message is received, control to disconnect from Wi-Fi.

6 Claims, 9 Drawing Sheets

(56) References Cited

U.S. PATENT DOCUMENTS

| | | | | |
|---|---|---|---|---|
| 2019/0037465 A1* | 1/2019 | Srivastava | ........ | H04W 36/0022 |
| 2019/0044980 A1* | 2/2019 | Russell | ............... | H04L 65/1073 |
| 2019/0124559 A1* | 4/2019 | Brown | .................. | H04W 48/06 |
| 2021/0029593 A1* | 1/2021 | Tsai | ................ | H04W 36/00226 |

FOREIGN PATENT DOCUMENTS

| | | | |
|---|---|---|---|
| CN | 107026857 | A | 8/2017 |
| CN | 108347539 | A | 7/2018 |
| CN | 108965306 | A | 12/2018 |
| CN | 110266576 | A | 9/2019 |
| CN | 111107058 | A | 5/2020 |
| EP | 1560387 | A1 | 8/2005 |
| KR | 1020120071997 | A | 7/2012 |
| WO | 2017167694 | A1 | 10/2017 |
| WO | 2018152961 | A1 | 8/2018 |

OTHER PUBLICATIONS

3GPP. "Technical Specification Group Services and System Aspects; Study on system impacts of IMS emergency sessions over WLAN (Release 13).", 3GPP TR 23.771 V2.0.0., Jun. 30, 2016 (Jun. 30, 2016), 64 pgs.

Korean Intellectual Property Office, "Written Opinion", From Application No. 1020227044070, Dated Apr. 24, 2025, pp. 7.

\* cited by examiner

WI-FI CONTROL METHOD AND APPARATUS AND ELECTRONIC DEVICE

CROSS-REFERENCE TO RELATED APPLICATIONS

This application is a continuation of International Application No. PCT/CN2021/097640, filed on Jun. 1, 2021, which claims priority to Chinese Patent Application No. 202010493976.2, filed in China on Jun. 3, 2020, which is incorporated herein by reference in its entirety.

TECHNICAL FIELD

This application relates to the field of communication technologies, and specifically, to a Wi-Fi control method and apparatus and an electronic device.

BACKGROUND

With the rapid development of mobile internet technologies, an operator can provide users with VoWiFi voice services through wireless fidelity (Wi-Fi) hotspots, and the users can access VoWiFi through Wi-Fi, so that the users can make and receive voice or video calls while using the mobile internet.

In the prior art, during normal registration of VoWiFi, an electronic device is inevitably disconnected from Wi-Fi. However, a network device detects, only after a dead peer detection (DPD) timer expires, that the electronic device is disconnected from Wi-Fi. Before the DPD timer expires, the network device is unable to know a connection status of the electronic device, and therefore still retains previous registration information and connection information of the electronic device. If the electronic device initiates a new connection request, the network device may possibly not respond to or directly reject the request, resulting in failure to register VoWiFi.

It can be seen that, in the prior art, after the electronic device is disconnected from Wi-Fi, the electronic device is unable to register VoWiFi in a timely manner, resulting in poor user experience.

SUMMARY

According to a first aspect of this application, a Wi-Fi control method is provided, where the method includes:

receiving a Wi-Fi disconnect request message;

sending, in response to the Wi-Fi disconnect request message, a notification message to a target network device, where the notification message indicates that a VoWiFi de-registration operation has been completed and that an internet key exchange IKE connection has been disconnected; and performing, in a case that a response message for responding to the notification message is received, control to disconnect from Wi-Fi.

According to a second aspect of this application, a Wi-Fi control apparatus is provided, where the apparatus includes:

a receiving module, configured to receive a Wi-Fi disconnect request message;

a sending module, configured to: in response to the Wi-Fi disconnect request message, send a notification message to a target network device, where the notification message indicates that a VoWiFi de-registration operation has been completed and that an internet key exchange IKE connection has been disconnected; and a first control module, configured to: in a case that a response message for responding to the notification message is received, perform control to disconnect from Wi-Fi.

According to a third aspect of this application, an electronic device is provided, where the electronic device includes a processor, a memory, and a program or an instruction stored in the memory and capable of running on the processor, where when the program or the instruction is executed by the processor, the steps of the method according to the first aspect are implemented.

According to a fourth aspect of this application, a readable storage medium is provided, where the readable storage medium stores a program or an instruction, and when the program or the instruction is executed by a processor, the steps of the method according to the first aspect are implemented.

According to a fifth aspect of this application, a chip is provided, which includes a processor and a communication interface, where the communication interface is coupled to the processor, and the processor is configured to run a program or an instruction to implement the method according to the first aspect.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first", "second", and the like are intended to distinguish between similar objects rather than to describe a specific order or sequence. It should be understood that the terms used in this way are interchangeable in appropriate circumstances so that the embodiments of this application can be implemented in other orders than the order illustrated or described herein. The objects distinguished by "first", "second", and the like are usually classified into one type, and the number of objects is not limited. For example, there may be one or more first objects. In addition, in the specification and claims, "and/or" represents at least one of connected objects, and the character "I" generally indicates an "or" relationship between contextually associated objects.

The following describes in detail a Wi-Fi control method provided in the embodiments of this application by using specific embodiments and application scenarios thereof with reference to the accompanying drawings.

Figure 1:
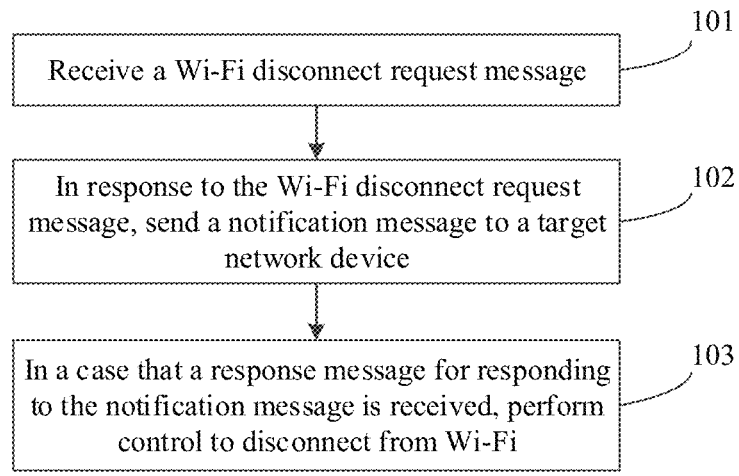
FIG. 1 is a flowchart of a Wi-Fi control method according to an embodiment of this application.

Referring to FIG. 1, FIG. 1 is a flowchart of a Wi-Fi control method according to an embodiment of this application.

It should be noted that the method may be applied to an electronic device, where the electronic device is user equipment (UE), including mobile call devices such as a mobile phone, smart devices such as a home voice assistant, multimedia devices, streaming media devices, or the like, which is not specifically limited in the embodiments of this application.

As shown in FIG. 1, the method includes the following steps.

Step 101. Receive a Wi-Fi disconnect request message.

In this step, the Wi-Fi disconnect request message received by the electronic device may be triggered by a Wi-Fi disconnect operation performed by a user. The Wi-Fi disconnect request message may be triggered by an operation performed by a user for directly turning off a Wi-Fi function, such as turning off a Wi-Fi control through clicking or tapping, or may be triggered by an operation performed by a user for indirectly turning off a Wi-Fi function, such as turning on an off-line mode, turning on an airplane mode, or turning off the electronic device, which is not specifically limited in the embodiments of this application.

Step 102. In response to the Wi-Fi disconnect request message, send a notification message to a target network device, where the notification message indicates that a VoWiFi de-registration operation has been completed and that an internet key exchange IKE connection has been disconnected.

In this step, the target network device is a device that provides network services for the electronic device for accessing an IP multimedia subsystem (IP Multimedia Subsystem, IMS) core network to perform VoWiFi services. The target network device may be a network device dedicated to providing VoWiFi network services, for example, an evolved packet data gateway (Evolved Packet Data Gateway, ePDG), where the ePDG is a network device suitable for a 4G network environment. It can be understood that the target network device may also be a network device suitable for 5G and other communication technologies, which is not specifically limited in the embodiments of this application.

When using the Wi-Fi technology to access the VoWiFi service, the electronic device needs to register the VoWiFi service first. Alternatively, the electronic device can establish an internet key exchange (Internet key exchange, IKE) connection with the network device through a Wi-Fi function of the electronic device, and successfully establish an IP security (Internet Protocol Security, IPSec) tunnel. Based on the IPSec tunnel, the electronic device can access the IMS core network through the network device to complete registration of the VoWiFi service.

In the prior art, after the IPSec tunnel is successfully established, the network device starts a DPD timer to help detect a connection status of the electronic device. The network device sends, only after the DPD timer expires, an IKE message to the electronic device to detect whether the electronic device is in a connected status. Before the DPD timer expires, if the electronic device is disconnected from Wi-Fi, the network device is unable to know this. In this case, if the electronic device initiates a new connection request to the network device because the Wi-Fi connection is disconnected and then resumed, the network device may no longer respond to the connection request or directly reject the connection request based on previously retained registration information and connection information. As a result, the electronic device fails to re-register the VoWiFi service.

In this embodiment of this application, in a case that the electronic device receives the Wi-Fi disconnect request message, the electronic device does not immediately perform control to disconnect from Wi-Fi, but does this with a slight delay. During this period, in a case that the VoWiFi service de-registration operation is completed and that the IKE connection between the electronic device and the target network device is disconnected, the electronic device sends the notification message to the target network device to notify the target network device that the network connection between the target network device and the current electronic device has been disconnected and that the VoWiFi service de-registration operation has been completed. Based on this, the target network device can delete the previously stored registration information and connection information of the electronic device, so that the electronic device can subsequently establish a new connection with the target network device in a timely manner and register VoWiFi in a timely manner.

Step 103: In a case that a response message for responding to the notification message is received, perform control to disconnect from Wi-Fi.

In this step, the response message for responding to the notification message may be a sending completion flag automatically returned when the notification message arrives at the target network device, or may be a response message returned by the target network device upon receiving of the notification message, which is not specifically limited in this embodiment of this application.

In this embodiment of this application, only in a case that the electronic device receives the response message for responding to the notification message, the electronic device performs control to disconnect from Wi-Fi, and then reflects this on an operation screen of a user to let the user know that the Wi-Fi connection of the current electronic device has been disconnected. At this point, the target network device has deleted the previously stored connection information and registration information of the electronic device. After that, whenever the user triggers a Wi-Fi connection request message, the target network device can respond to a connection request of the electronic device in a timely manner, so that the electronic device can establish a new network connection with the target network device in a timely manner and register the VoWiFi service in a timely manner.

In this embodiment of this application, the Wi-Fi disconnect request message is received; in response to the Wi-Fi disconnect request message, the notification message is sent to the target network device, where the notification message indicates that the VoWiFi de-registration operation has been completed and that the internet key exchange IKE connection has been disconnected; and in the case that a response message for responding to the notification message is received, control is performed to disconnect from Wi-Fi. The notification message indicating that the IKE connection has been disconnected and that the VoWiFi de-registration operation has been completed is sent to the target network device, so as to notify, in a timely manner, the target network device to release previously stored connection information and registration information. After that, whenever the electronic device reconnects to Wi-Fi, the electronic device can establish a new network connection with the target network device in a timely manner and register VoWiFi in a timely manner, thereby improving user experience.

Figure 2:
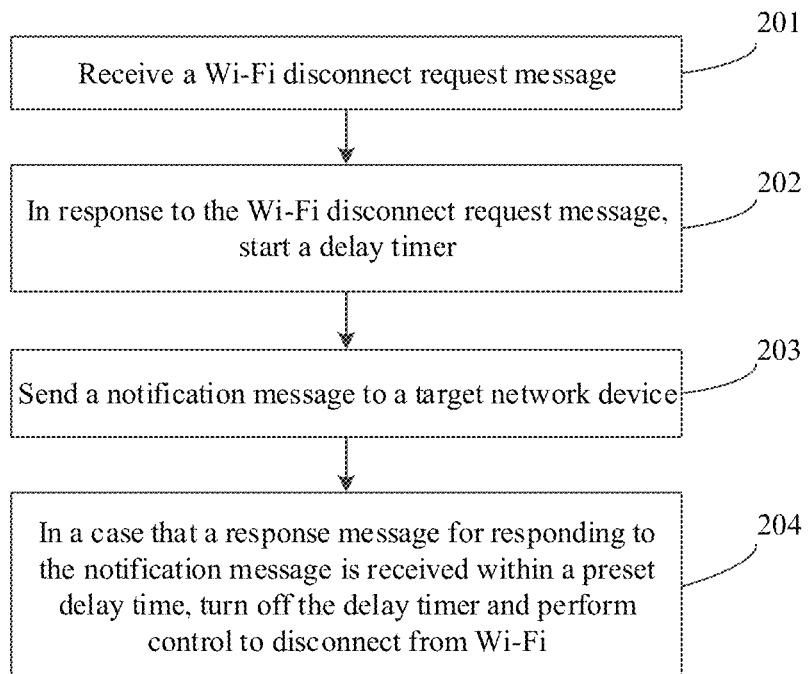
FIG. 2 is a flowchart of another Wi-Fi control method according to an embodiment of this application.

Referring to FIG. 2, FIG. 2 is a flowchart of another Wi-Fi control method according to an embodiment of this application. It should be noted that the method may be applied to an electronic device, where the electronic device is user equipment (User Equipment, UE), including mobile call devices such as a mobile phone, smart devices such as a home voice assistant, multimedia devices, streaming media devices, or the like, which is not specifically limited in the embodiments of this application.

As shown in FIG. 2, the method includes the following steps.

Step 201. Receive a Wi-Fi disconnect request message.

For a specific implementation form of this step, reference may be made to the description of step 101 in the embodiment shown in FIG. 1, and details are not described herein to avoid repetition.

Step 202. In response to the Wi-Fi disconnect request message, start a delay timer.

After receiving the Wi-Fi disconnect request message, the electronic device does not immediately perform control to disconnect from Wi-Fi, but does this with a slight delay. Therefore, in order to prevent a user from perceiving the delayed operation while such perception will affects user experience, in this embodiment of this application, when the electronic device receives the Wi-Fi disconnect request message, the electronic device can start the delay timer to delay, so as to ensure that after the electronic device responds to the Wi-Fi disconnect request message, a time for completing a VoWiFi service de-registration operation, an operation of disconnecting an IKE connection between the electronic device and a target network device, and sending a notification message to the target network device is not so long and thus not perceived by the user.

The delay timer can preset a maximum delay time as a delay upper limit. The maximum delay time may be a maximum tolerable delay time that is not easily perceived by the user, for example, 500 milliseconds. When a delay time of the delay timer reaches the maximum delay time, the delay timer can give an alert or automatically shut down to remind the electronic device to perform a next operation. The delay timer may alternatively not preset the delay upper limit, and the electronic device performs a next operation when detecting that the delay timer delays to the maximum tolerable delay time that is not easily perceived by the user, for example, 500 milliseconds. This is not specifically limited in this embodiment of this application.

Step 203. Send the notification message to the target network device, where the notification message indicates that the VoWiFi de-registration operation has been completed and that the internet key exchange IKE connection has been disconnected.

In this step, the target network device is a device that provides network services for the electronic device to access an IP multimedia subsystem (IMS) core network and perform VoWiFi services. The target network device may be a network device providing VoWiFi network services, for example, an evolved packet data gateway (ePDG), where the ePDG is a network device suitable for a 4G network environment. It can be understood that the target network device may also be a network device suitable for 5G and other communication technologies, which is not specifically limited in the embodiments of this application.

In this embodiment of this application, in a case that the Wi-Fi disconnect request message is received, the electronic device starts the delay timer to delay. In a case that the VoWiFi service de-registration operation is completed and that the IKE connection between the electronic device and the target network device is disconnected, the electronic device sends the notification message to the target network device to notify the target network device that the electronic device has been currently disconnected from Wi-Fi and that the VoWiFi service de-registration operation has been completed. Based on this, the target network device can delete the previously stored registration information and connection information of the electronic device, so that the electronic device can subsequently establish a new network connection with the target network device in a timely manner and register VoWiFi in a timely manner.

Step 204. In a case that a response message for responding to the notification message is received within a preset delay time, turn off the delay timer and perform control to disconnect from Wi-Fi.

In this step, the response message for responding to the notification message may be a sending completion flag automatically returned when the notification message arrives at the target network device, or may be a response message returned by the target network device upon receiving of the notification message, which is not specifically limited in this embodiment of this application.

In this step, in some implementations, the preset delay time may be the maximum delay time preset by the delay timer in step 202, for example, 500 milliseconds. Before the delay timer gives an alert or automatically shuts down, if the electronic device has received the response message for responding to the notification message, the electronic device can directly control the delay timer to shut down, and perform control to disconnect from Wi-Fi.

In some other implementations, the preset delay time may alternatively be a delay time preset by the electronic device. Before the delay time of the delay timer reaches the preset delay time, if the electronic device has received the response message for responding to the notification message, the electronic device can directly control the delay timer to shut down, and perform control to disconnect from Wi-Fi.

In this embodiment of this application, the delay timer is started and the delay time is preset, ensuring that after the electronic device responds to the Wi-Fi disconnect request message, the time for completing the VoWiFi service de-registration operation and the operation of disconnecting the IKE connection between the electronic device and the target network device is not so long and thus not perceived by the user, thereby not affecting user experience.

Optionally, after the sending a notification message to the target network device, the method further includes:

in a case that no response message for responding to the notification message is received within the preset delay time, performing control to disconnect from Wi-Fi.

In this embodiment of this application, no response message for responding to the notification message being received within the preset delay time can be understood as follows: in an implementation that the delay timer presets the maximum delay time, when the delay timer gives an alert or automatically shuts down, the electronic device has not received the response message for responding to the notification message; or in an implementation that the delay timer does not preset the maximum delay time but the electronic device presets the preset delay time, when the delay time of the delay timer reaches the preset delay time, the electronic device has not received the response message for responding to the notification message.

Generally, it only takes 100 to 300 milliseconds for the electronic device to complete the VoWiFi service de-registration operation and the operation of disconnecting the IKE connection between the electronic device and the target network device, and a message transmission time for the electronic device to send the notification message to the target network side and to receive the response message is shorter. The electronic device may set the preset delay time to 500 milliseconds or other empirical values. Then, in a case that the electronic device is in a normal state, or in other words, a Wi-Fi function of the electronic device is in a normal state, the electronic device can receive the response message within the preset delay time.

However, problems such as failure of the electronic device, failure of the Wi-Fi function of the electronic device, and failure of message transmission are not excluded. Based on this, in this embodiment of this application, the delay timer is started and the preset delay time, that is, the maximum tolerable delay time that is not easily perceived by the user, is preset. If the preset delay time is exceeded, to ensure that the user does not perceive the delayed operation of disconnecting from Wi-Fi, even if the notification message does not reach the target network device, the electronic device still performs control to disconnect from Wi-Fi, to not affect user experience.

It should be noted that the implementation in this embodiment of this application is also applicable to the embodiment described in FIG. 1 to achieve the same technical effects, and details are not described herein to avoid repetition.

Optionally, after the starting a delay timer in response to the Wi-Fi disconnect request message, the method further includes:

determining whether VoWiFi has been registered; and in a case that it is determined that VoWiFi has been registered, completing the VoWiFi de-registration operation and disconnecting the IKE connection.

In this embodiment of this application, in a case that the Wi-Fi disconnect request message is received, the electronic device first determines whether the VoWiFi service has been registered. Because this embodiment of this application is implemented in a scenario in which a network connection between the electronic device and the target network device is implemented by the VoWiFi service, if the electronic device does not register the VoWiFi service, the electronic device may perform processing based on a prior-art implementation of performing control to disconnect from Wi-Fi, which is not be described in detail herein.

In this embodiment of this application, after the electronic device starts the delay timer to delay, in a case that the electronic device has registered VoWiFi, the electronic device first completes the VoWiFi de-registration operation and disconnects the IKE connection. The electronic device can perform control through its own IMS module, to complete the VoWiFi de-registration operation and disconnect the IKE connection. After that, the electronic device can send, to the target network device, the notification message indicating that the VoWiFi de-registration operation has been completed and that the internet key exchange IKE connection has been disconnected.

It should be noted that the implementation in this embodiment of this application is also applicable to the embodiment described in FIG. 1 to achieve the same technical effects, and details are not described herein to avoid repetition.

Further, the completing the VoWiFi de-registration operation and disconnecting the IKE connection includes:

sending a VoWiFi de-registration request message to an IP multimedia subsystem IMS server to cause the IMS server to release VoWiFi registration information, so as to complete the VoWiFi de-registration operation; and sending an IKE connection disconnect request message to the IMS server to cause the IMS server to release IKE connection information, so as to disconnect the IKE connection.

The electronic device accesses the IMS core network through the target network device to perform the VoWiFi service. The electronic device performs registration and de-registration operations related to the VoWiFi service and operations of establishing and disconnecting the IKE connection with the target network device. Such operations are all performed and managed through the IMS core network. The electronic device may include, for example, the IMS module for communicating with the IMS core network, so as to manage the connection and registration related to the VoWiFi service of the electronic device.

In this embodiment of this application, the electronic device sends the VoWiFi de-registration request message to the IMS server to cause the IMS server to perform the VoWiFi de-registration operation and release the VoWiFi registration information of the electronic device after receiving the request message. The releasing the VoWiFi registration information may be understood as that the IMS server deletes registration information related to the electronic device and clears registration memories for the electronic device from the IMS server, so that the electronic device can successfully register the VoWiFi service when reconnecting to Wi-Fi subsequently, instead of suffering registration failure due to previous registration information still retained by the IMS server.

In addition, the electronic device further sends the IKE connection disconnect request message to the IMS server to cause the IMS server to disconnect the IKE connection and release the IKE connection information after receiving the request message. The releasing the IKE connection information may be understood as that the IMS server disconnects the IKE connection between the electronic device and the target network device, releases an IPSec tunnel between the electronic device and the target network device, deletes connection information related to the electronic device, and clears connection memories for the electronic device from the IMS server, so that the electronic device can successfully establish an IKE connection with the target network device when reconnecting to Wi-Fi subsequently.

In this embodiment of this application, after completing the foregoing operations, the IMS server returns a response message to the electronic device to indicate that the VoWiFi de-registration operation has been completed and that the IKE connection has been disconnected. The electronic device can send the response message returned by the IMS server as a notification message to the target network device, to notify the target network device to release the previously stored connection information and registration information.

It should be noted that the implementation in this embodiment of this application is also applicable to the embodiment described in FIG. 1 to achieve the same technical effects, and details are not described herein to avoid repetition.

Figure 3:
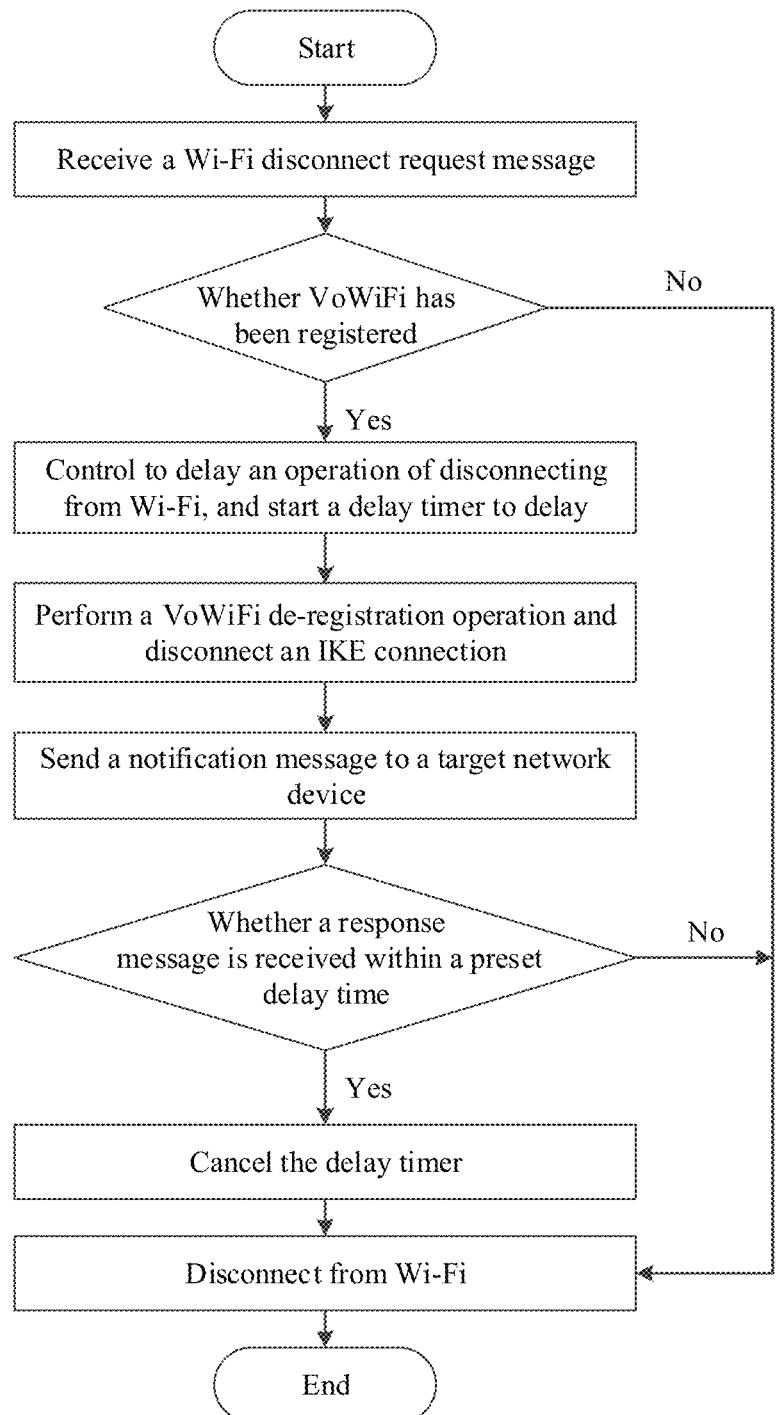
FIG. 3 is a flowchart of still another Wi-Fi control method according to an embodiment of this application.

The following describes an embodiment of this application by using an example implementation. As shown in FIG. 3:

in this embodiment of this application, a user triggers a Wi-Fi disconnect operation such that an electronic device receives a Wi-Fi disconnect request message. In this case, the electronic device first determines whether a VoWiFi service has been currently registered.

In a case that the VoWiFi service has been registered, the electronic device controls to delay an operation of disconnecting from Wi-Fi, and starts a delay timer to delay. In addition, the electronic device starts to perform a VoWiFi de-registration operation and disconnect an IKE connection. In a case that no VoWiFi service is registered, the electronic device can directly perform control to disconnect from Wi-Fi.

The electronic device performs the VoWiFi de-registration operation and disconnects the IKE connection. Alternatively, the electronic device sends a VoWiFi de-registration request message and an IKE connection disconnect request message to an IMS server, and then waits for the IMS server to return a response message indicating that the VoWiFi de-registration operation has been completed and that the internet key exchange IKE connection has been disconnected.

The electronic device sends a notification message to a target network device and waits for the target network device to return a response message.

In a case that the response message returned by the target network device is received within a maximum delay time of the delay timer, the delay timer is canceled and control is performed to disconnect from Wi-Fi. Alternatively, if the electronic device receives, within the maximum delay time of the delay timer, the response message returned by the target network device, the electronic device cancels the delay timer and controls to disconnect the Wi-Fi connection; and if the electronic device receives, within the maximum delay time of the delay timer, no response message returned by the target network device, the electronic device directly controls to disconnect the Wi-Fi connection.

In the embodiments of this application, a variety of optional implementations are added based on the embodiment shown in FIG. 1, which shortens a time for the target network device to respond to disconnection, and ensures that the delay of Wi-Fi disconnection is not easily perceived by a user.

It should be noted that the Wi-Fi control method provided in the embodiments of this application may be performed by a Wi-Fi control apparatus, or a control module configured to perform the Wi-Fi control method in the Wi-Fi control method. In the embodiments of this application, the Wi-Fi control apparatus provided in the embodiments of this application is described by using an example in which the Wi-Fi control apparatus performs the Wi-Fi control method.

Figure 4:
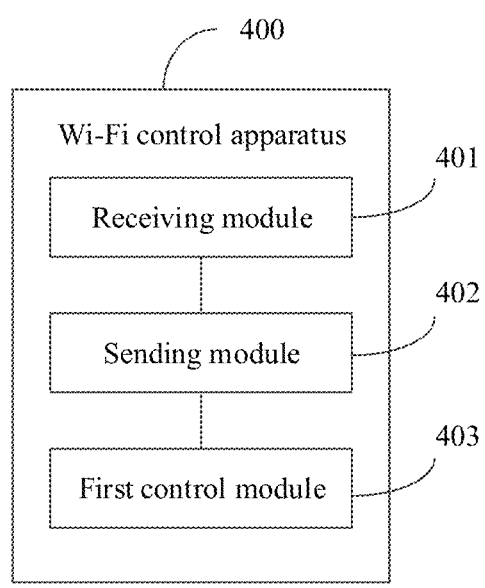
FIG. 4 is a first structural diagram of a Wi-Fi control apparatus according to an embodiment of this application.

Referring to FIG. 4, FIG. 4 is a schematic structural diagram of a Wi-Fi control apparatus according to an embodiment of this application.

As shown in FIG. 4, the Wi-Fi control apparatus 400 includes:

a receiving module 401, configured to receive a Wi-Fi disconnect request message;

a sending module 402, configured to: in response to the Wi-Fi disconnect request message, send a notification message to a target network device, where the notification message indicates that a VoWiFi de-registration operation has been completed and that an internet key exchange IKE connection has been disconnected;

and a first control module 403, configured to: in a case that a response message for responding to the notification message is received, perform control to disconnect from Wi-Fi.

Figure 5:
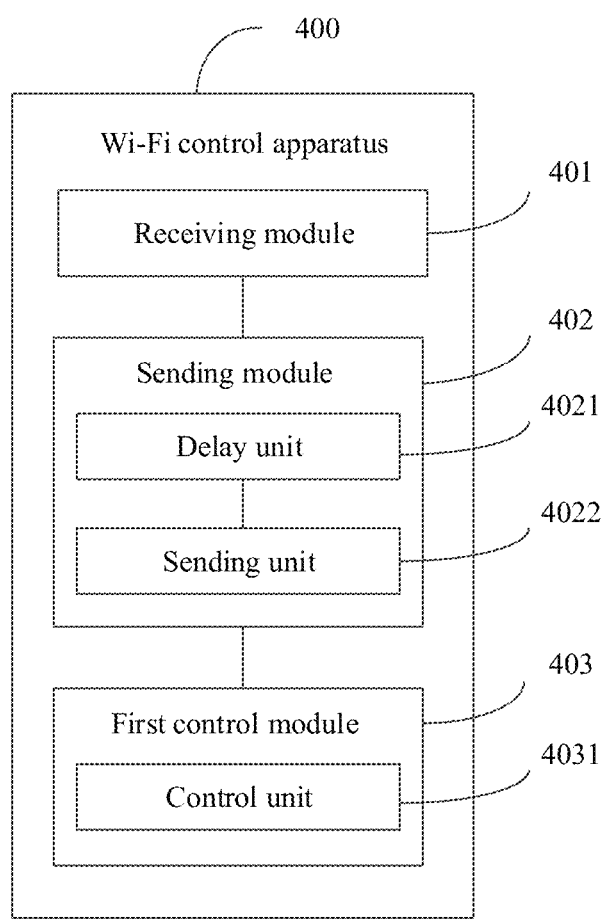
FIG. 5 is a second structural diagram of a Wi-Fi control apparatus according to an embodiment of this application.

Optionally, as shown in FIG. 5, the sending module 402 includes:

a delay unit 4021, configured to: in response to the Wi-Fi disconnect request message, start a delay timer; and a sending unit 4022, configured to send the notification message to the target network device; and the first control module 403 includes:

a control unit 4031, configured to: in the case that a response message for responding to the notification message is received within a preset delay time, turn off the delay timer and perform control to disconnect from Wi-Fi.

Figure 6:
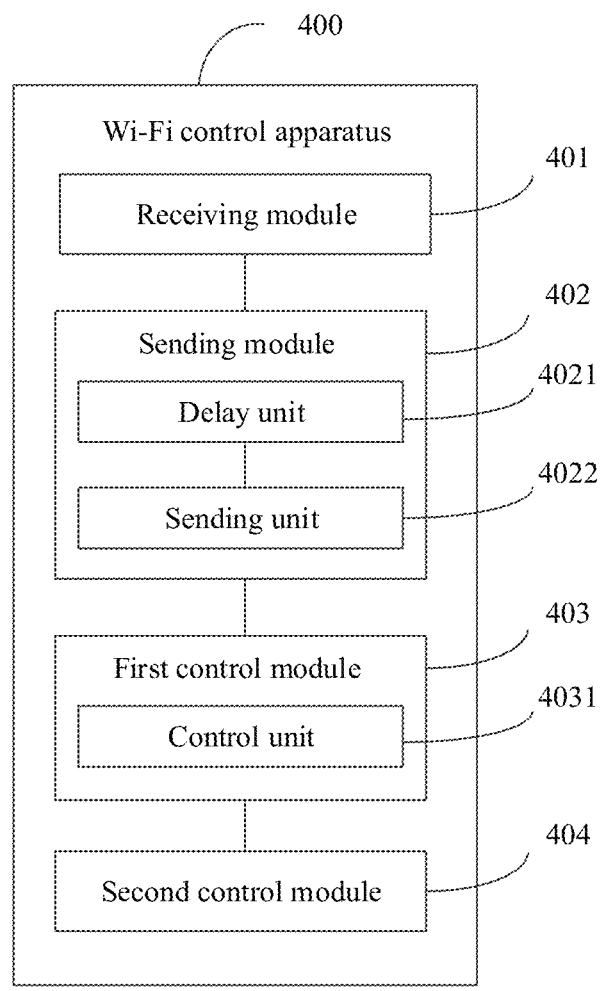
FIG. 6 is a third structural diagram of a Wi-Fi control apparatus according to an embodiment of this application.

Optionally, as shown in FIG. 6, the Wi-Fi control apparatus 400 further includes:

a second control module 404, configured to: in a case that no response message for responding to the notification message is received within the preset delay time, perform control to disconnect from Wi-Fi.

Figure 7:
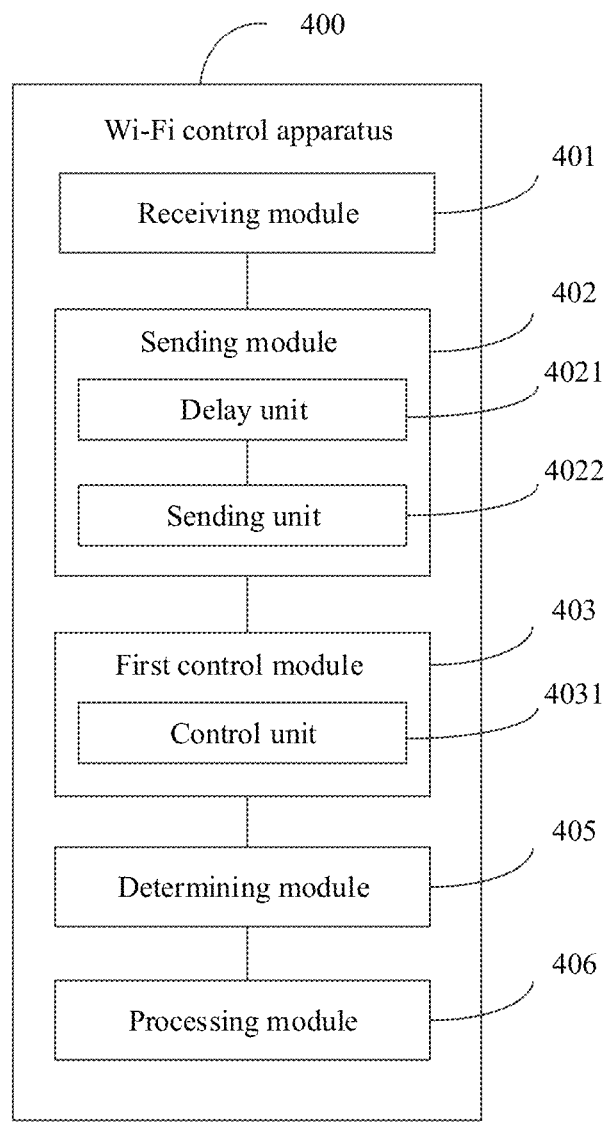
FIG. 7 is a fourth structural diagram of a Wi-Fi control apparatus according to an embodiment of this application.

Optionally, as shown in FIG. 7, the Wi-Fi control apparatus 400 further includes:

a determining module 405, configured to determine whether VoWiFi has been registered; and a processing module 406, configured to: in a case that it is determined that VoWiFi has been registered, complete the VoWiFi de-registration operation and disconnect the IKE connection.

Figure 8:
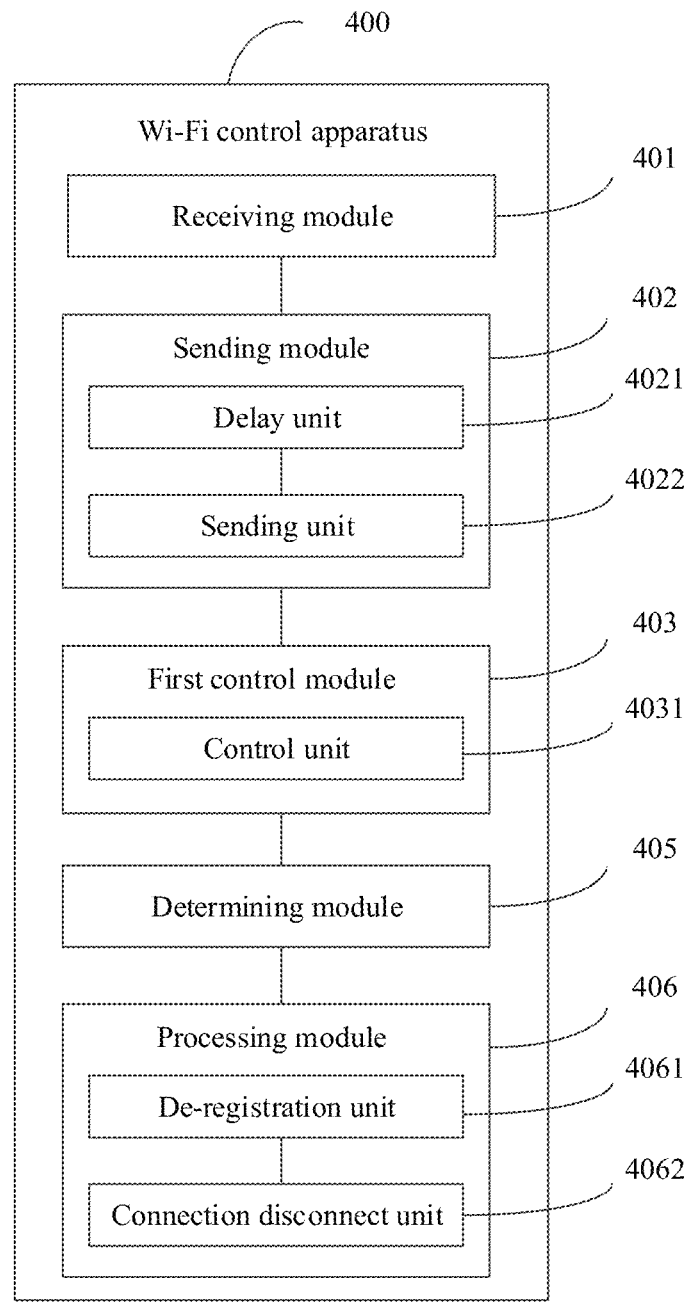
FIG. 8 is a fifth structural diagram of a Wi-Fi control apparatus according to an embodiment of this application.

Optionally, as shown in FIG. 8, the processing module 406 includes:

a de-registration unit 4061, configured to send a VoWiFi de-registration request message to an IP multimedia subsystem IMS server to cause the IMS server to release VoWiFi registration information, so as to complete the VoWiFi de-registration operation; and a connection disconnect unit 4062, configured to send an IKE connection disconnect request message to the IMS server to cause the IMS server to release IKE connection information, so as to disconnect the IKE connection.

The Wi-Fi control apparatus provided in the embodiments of this application can receive the Wi-Fi disconnect request message; send the notification message to the target network device in response to the Wi-Fi disconnect request message, where the notification message indicates that the VoWiFi de-registration operation has been completed and that the internet key exchange IKE connection has been disconnected; and in the case that a response message for responding to the notification message is received, perform control to disconnect from Wi-Fi. The notification message indicating that the IKE connection has been disconnected and that the VoWiFi de-registration operation has been completed is sent to the target network device, so as to notify, in a timely manner, the target network device to release previously stored connection information and registration information. After that, whenever the electronic device reconnects to Wi-Fi, the electronic device can establish a new network connection with the target network device in a timely manner and register VoWiFi in a timely manner, thereby improving user experience.

The Wi-Fi control apparatus in the embodiments of this application may be a device, or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, a vehicle-mounted electronic device, a wearable device, an ultra-mobile personal computer (UMPC), a netbook, a personal digital assistant (PDA), or the like. The non-mobile electronic device may be a server, a network attached storage (NAS), a personal computer (PC), a television (TV), a teller machine, a self-service machine, or the like. This is not specifically limited in the embodiments of this application.

The Wi-Fi control apparatus in the embodiments of this application may be an apparatus with an operating system. The operating system may be an Android (Android) operating system, may be an iOS operating system, or may be other possible operating systems, which is not specifically limited in the embodiments of this application.

The Wi-Fi control apparatus provided in the embodiments of this application is capable of implementing various processes implemented in the method embodiments of FIG. 1 to FIG. 3. To avoid repetition, details are not described again herein.

Figure 9:
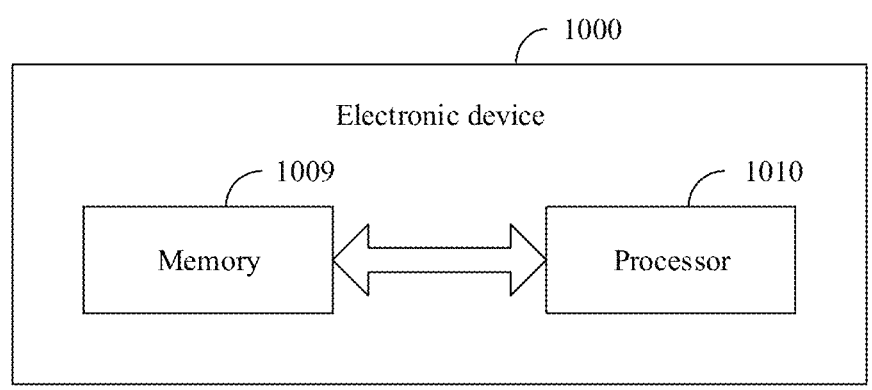
FIG. 9 is a first structural diagram of an electronic device according to an embodiment of this application.

Optionally, as shown in FIG. 9, an embodiment of this application further provides an electronic device, including a processor 1010, a memory 1009, and a program or an instruction stored in the memory 1009 and capable of running on the processor 1010. When the program or the instruction is executed by the processor 1010, the processes of the foregoing Wi-Fi control method embodiments are implemented, with the same technical effects achieved. To avoid repetition, details are not described again herein.

It should be noted that the electronic device in this embodiment of this application includes the mobile electronic device and non-mobile electronic device described above.

Figure 10:
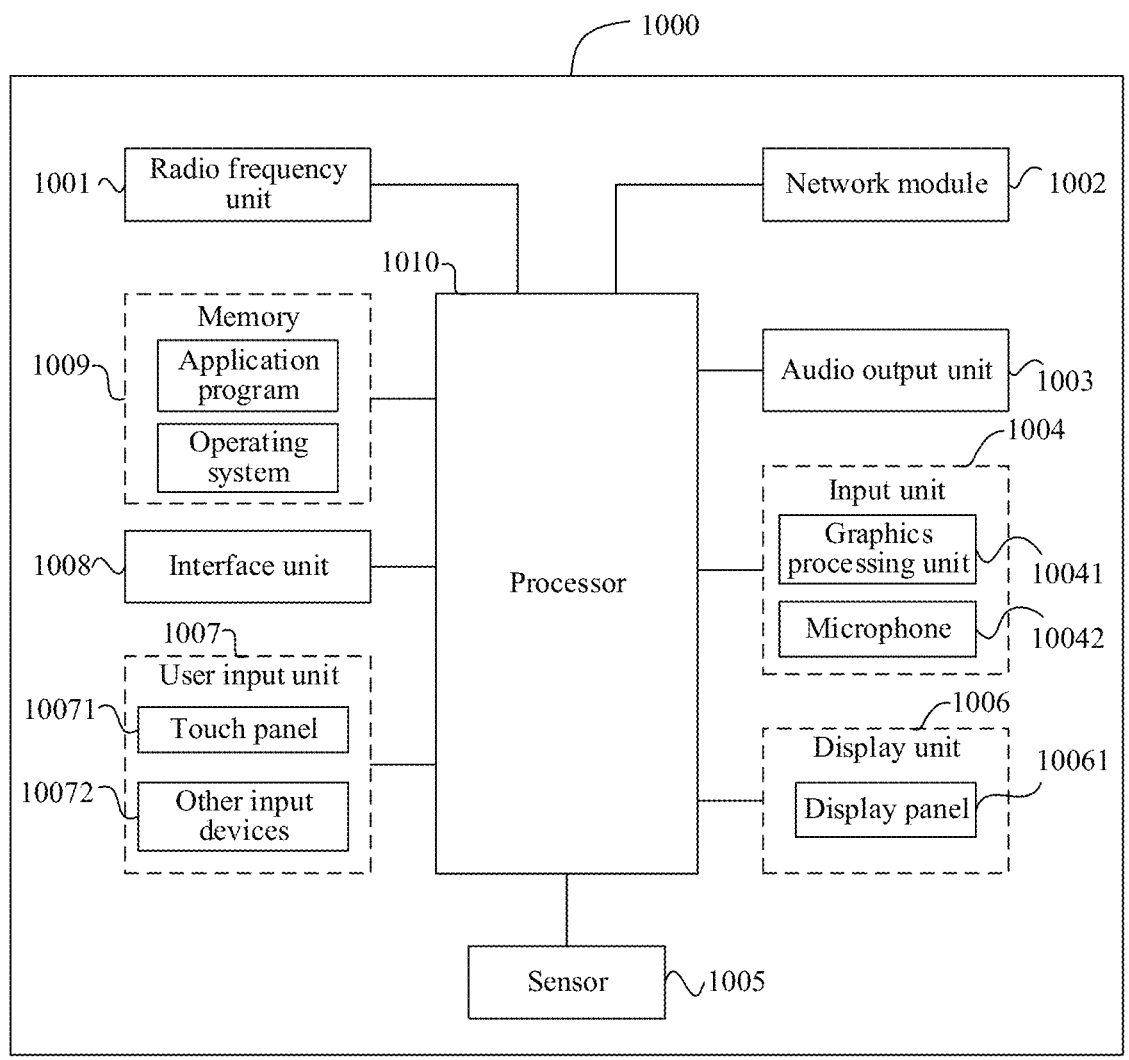
FIG. 10 is a second structural diagram of an electronic device according to an embodiment of this application.

FIG. 10 is a schematic diagram of a hardware structure of an electronic device according to an embodiment of this application.

The electronic device 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art can understood that the electronic device 1000 may further include a power supply (such as a battery) that supplies power to the components. The power supply may be logically connected to the processor 1010 via a power management system, so that functions such as charge and discharge management and power consumption management are implemented via the power management system. The structure of the electronic device shown in FIG. 10 does not constitute a limitation on the electronic device. The electronic device may include more or fewer components than shown in the figure, or combination of some components, or the components disposed differently. Details are not described herein.

The processor 1010 is configured to: receive a Wi-Fi disconnect request message; in response to the Wi-Fi disconnect request message, send a notification message to a target network device, where the notification message indicates that a VoWiFi de-registration operation has been completed and that an internet key exchange IKE connection has been disconnected; and in a case that a response message for responding to the notification message is received, perform control to disconnect from Wi-Fi.

Optionally, the processor 1010 is further configured to: in response to the Wi-Fi disconnect request message, start a delay timer; and send the notification message to the target network device; and in the case that a response message for responding to the notification message is received within a preset delay time, turn off the delay timer and perform control to disconnect from Wi-Fi.

After the sending a notification message to the target network device, the processor 1010 is further configured to:

in a case that no response message for responding to the notification message is received within the preset delay time, perform control to disconnect from Wi-Fi.

Optionally, the processor 1010 is further configured to: determine whether VoWiFi has been registered; and in a case that it is determined that VoWiFi has been registered, complete the VoWiFi de-registration operation and disconnect the IKE connection.

Optionally, the processor 1010 is further configured to send a VoWiFi de-registration request message to an IP multimedia subsystem IMS server to cause the IMS server to release VoWiFi registration information, so as to complete the VoWiFi de-registration operation; and send an IKE connection disconnect request message to the IMS server to cause the IMS server to release IKE connection information, so as to disconnect the IKE connection.

The electronic device provided in this embodiment of this application sends the notification message indicating that the IKE connection has been disconnected and that the VoWiFi de-registration operation has been completed to the target network device, so as to notify, in a timely manner, the target network device to release previously stored connection information and registration information. After that, whenever the electronic device reconnects to Wi-Fi, the electronic device can establish a new network connection with the target network device in a timely manner and register VoWiFi in a timely manner, thereby improving user experience.

It should be understood that in this embodiment of this application, the input unit 1004 may include a graphics processing unit (GPU) 10041 and a microphone 10042. The graphics processing unit 10041 processes image data of a static picture or a video obtained by an image capture apparatus (for example, a camera) in a video capture mode or an image capture mode. The display unit 1006 may include a display panel 10061. The display panel 10061 may be configured in a form of a liquid crystal display, an organic light-emitting diode, or the like. The user input unit 1007 includes a touch panel 10071 and other input devices 10072. The touch panel 10071 is also referred to as a touchscreen. The touch panel 10071 may include two parts: a touch detection apparatus and a touch controller. The other input devices 10072 may include but are not limited to a physical keyboard, a function key (such as a volume control key or a switch key), a trackball, a mouse, and a joystick. Details are not described herein. The memory 1009 may be configured to store software programs and various data, including but not limited to application programs and operating systems. The processor 1010 may integrate an application processor and a modem processor. The application processor mainly processes an operating system, a user interface, an application program, and the like. The modem processor mainly processes wireless communication. It can be understood that the modem processor may alternatively not be integrated in the processor 1010.

An embodiment of this application further provides a readable storage medium, where the readable storage medium stores a program or an instruction, and when the program or the instruction is executed by a processor, the processes of the foregoing Wi-Fi control method embodiments are implemented, with the same technical effects achieved. To avoid repetition, details are not described again herein.

The processor is the processor in the electronic device described in the foregoing embodiments. The readable storage medium includes a computer-readable storage medium such as a computer read-only memory (ROM), a random access memory (RAM), a magnetic disk, or an optical disc.

An embodiment of this application further provides a chip, including a processor and a communication interface, where the communication interface is coupled to the processor, and the processor is configured to run a program or an instruction to implement the processes of the foregoing Wi-Fi control method embodiments, with the same technical effects achieved. To avoid repetition, details are not described again herein.

It should be understood that the chip mentioned in this embodiment of this application may also be referred to as a system-on-chip, a system chip, a chip system, or the like.

It should be noted that in this specification, the terms "include", "comprise", or any of their variants are intended to cover a non-exclusive inclusion such that a process, method, article, or apparatus that includes a list of elements not only includes those elements but also includes other elements that are not expressly listed, or also includes elements inherent to such process, method, article, or apparatus. In absence of more constraints, an element preceded by "includes a/an . . . " does not preclude the presence of other identical elements in the process, method, article, or apparatus that includes the element. In addition, it should be noted that the method and apparatus in the embodiments of this application are not limited to performing functions in the order shown or discussed, but may also include performing the functions at substantially the same time or in reverse order depending on the functions involved. For example, the method described may be performed in an order different from that described, where various steps may be also added, omitted, or combined. In addition, features described with reference to some examples may be combined in other examples.

According to the foregoing description of the implementations, a person skilled in the art can clearly understand that the method in the foregoing embodiments may be implemented by software in combination with a necessary common hardware platform, and certainly may alternatively be implemented by hardware. However, in most cases, the former is a more preferred implementation. Based on such an understanding, the technical solutions of this application essentially, or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As inspired by this application, a person of ordinary skill in the art may develop many other forms without departing from the principle of this application and the protection scope of the claims, and all such forms fall within the protection scope of this application.

What is claimed is:

1. A Wi-Fi control method, comprising:
receiving a Wi-Fi disconnect request message;
sending, in response to the Wi-Fi disconnect request message, a notification message to a target network device, wherein the notification message indicates that a VoWiFi de-registration operation has been completed and that an internet key exchange (IKE) connection has been disconnected; and
performing, in a case that a response message for responding to the notification message is received, control to disconnect from Wi-Fi;
wherein the sending, in response to the Wi-Fi disconnect request message, the notification message to the target network device comprises:
starting a delay timer in response to the Wi-Fi disconnect request message; and
sending the notification message to the target network device; and
the performing, in a case that a response message for responding to the notification message is received, control to disconnect from Wi-Fi comprises:
in the case that a response message for responding to the notification message is received within a preset delay time, turning off the delay timer and performing control to disconnect from Wi-Fi;
wherein after the starting the delay timer in response to the Wi-Fi disconnect request message, the method further comprises:
determining whether VoWiFi has been registered; and
in a case that it is determined that VoWiFi has been registered, completing the VoWiFi de-registration operation and disconnecting the IKE connection;
wherein the completing the VoWiFi de-registration operation and disconnecting the IKE connection comprises:
sending a VoWiFi de-registration request message to an IP multimedia subsystem (IMS) server to cause the IMS server to release VoWiFi registration information, so as to complete the VoWiFi de-registration operation; and
sending an IKE connection disconnect request message to the IMS server to cause the IMS server to release IKE connection information, so as to disconnect the IKE connection.

2. The method according to claim 1, wherein after the sending the notification message to the target network device, the method further comprises:
in a case that no response message for responding to the notification message is received within the preset delay time, performing control to disconnect from Wi-Fi.

3. An electronic device, comprising:
a processor; and
a memory storing a program or an instruction that is capable of running on the processor, wherein the program or the instruction, when executed by the processor, causes the electronic device to perform the following steps:
receiving a Wi-Fi disconnect request message;
sending, in response to the Wi-Fi disconnect request message, a notification message to a target network device, wherein the notification message indicates that a VoWiFi de-registration operation has been completed and that an internet key exchange (IKE) connection has been disconnected; and
performing, in a case that a response message for responding to the notification message is received, control to disconnect from Wi-Fi;
wherein the sending, in response to the Wi-Fi disconnect request message, the notification message to the target network device comprises:
starting a delay timer in response to the Wi-Fi disconnect request message; and
sending the notification message to the target network device; and the performing, in a case that a response message for responding to the notification message is received, control to disconnect from Wi-Fi comprises:
in the case that a response message for responding to the notification message is received within a preset delay time, turning off the delay timer and performing control to disconnect from Wi-Fi;
wherein after the starting the delay timer in response to the Wi-Fi disconnect request message, the method further comprises:
determining whether VoWiFi has been registered; and
in a case that it is determined that VoWiFi has been registered, completing the VoWiFi de-registration operation and disconnecting the IKE connection;
wherein the completing the VoWiFi de-registration operation and disconnecting the IKE connection comprises:
sending a VoWiFi de-registration request message to an IP multimedia subsystem (IMS) server to cause the IMS server to release VoWiFi registration information, so as to complete the VoWiFi de-registration operation; and
sending an IKE connection disconnect request message to the IMS server to cause the IMS server to release IKE connection information, so as to disconnect the IKE connection.

4. The electronic device according to claim 3, wherein after the sending the notification message to the target network device, the program or the instruction, when executed by the processor, causes the electronic device to further perform the following steps:
in a case that no response message for responding to the notification message is received within the preset delay time, performing control to disconnect from Wi-Fi.

5. A non-transitory readable storage medium storing a program or an instruction, wherein the program or the instruction, when executed by a processor, performs the following steps:
receiving a Wi-Fi disconnect request message;
sending, in response to the Wi-Fi disconnect request message, a notification message to a target network device, wherein the notification message indicates that a VoWiFi de-registration operation has been completed and that an internet key exchange IKE connection has been disconnected; and
performing, in a case that a response message for responding to the notification message is received, control to disconnect from Wi-Fi;
wherein the sending, in response to the Wi-Fi disconnect request message, the notification message to the target network device comprises:
starting a delay timer in response to the Wi-Fi disconnect request message; and
sending the notification message to the target network device; and
the performing, in a case that a response message for responding to the notification message is received, control to disconnect from Wi-Fi comprises:
in the case that a response message for responding to the notification message is received within a preset delay time, turning off the delay timer and performing control to disconnect from Wi-Fi;
wherein after the starting the delay timer in response to the Wi-Fi disconnect request message, the method further comprises:
determining whether VoWiFi has been registered; and
in a case that it is determined that VoWiFi has been registered, completing the VoWiFi de-registration operation and disconnecting the IKE connection;
wherein the completing the VoWiFi de-registration operation and disconnecting the IKE connection comprises:
sending a VoWiFi de-registration request message to an IP multimedia subsystem (IMS) server to cause the IMS server to release VoWiFi registration information, so as to complete the VoWiFi de-registration operation; and
sending an IKE connection disconnect request message to the IMS server to cause the IMS server to release IKE connection information, so as to disconnect the IKE connection.

6. The non-transitory readable storage medium according to claim 5, wherein after the sending the notification message to the target network device, the program or the instruction, when executed by the processor, further performs the following steps:
in a case that no response message for responding to the notification message is received within the preset delay time, performing control to disconnect from Wi-Fi.

\* \* \* \* \*